UNITED STATES PATENT OFFICE.

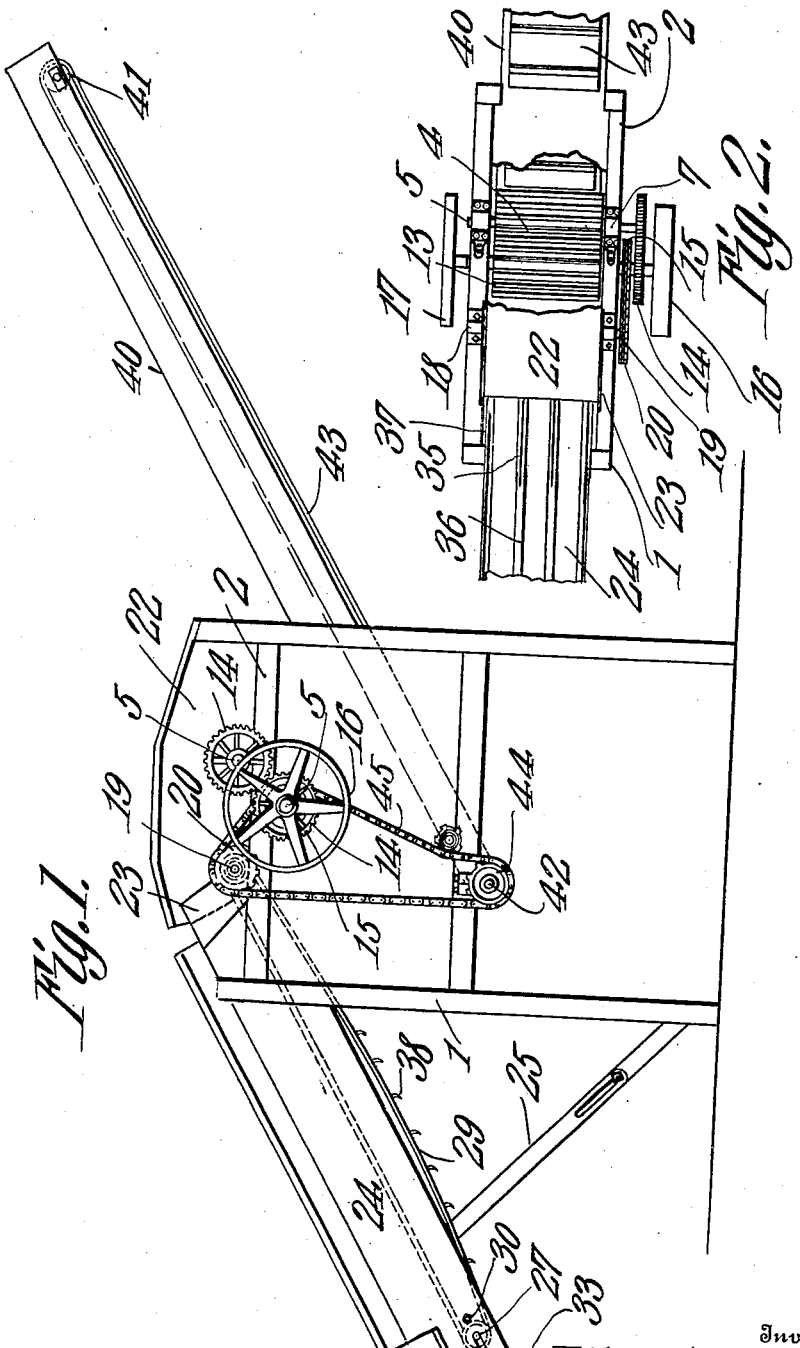

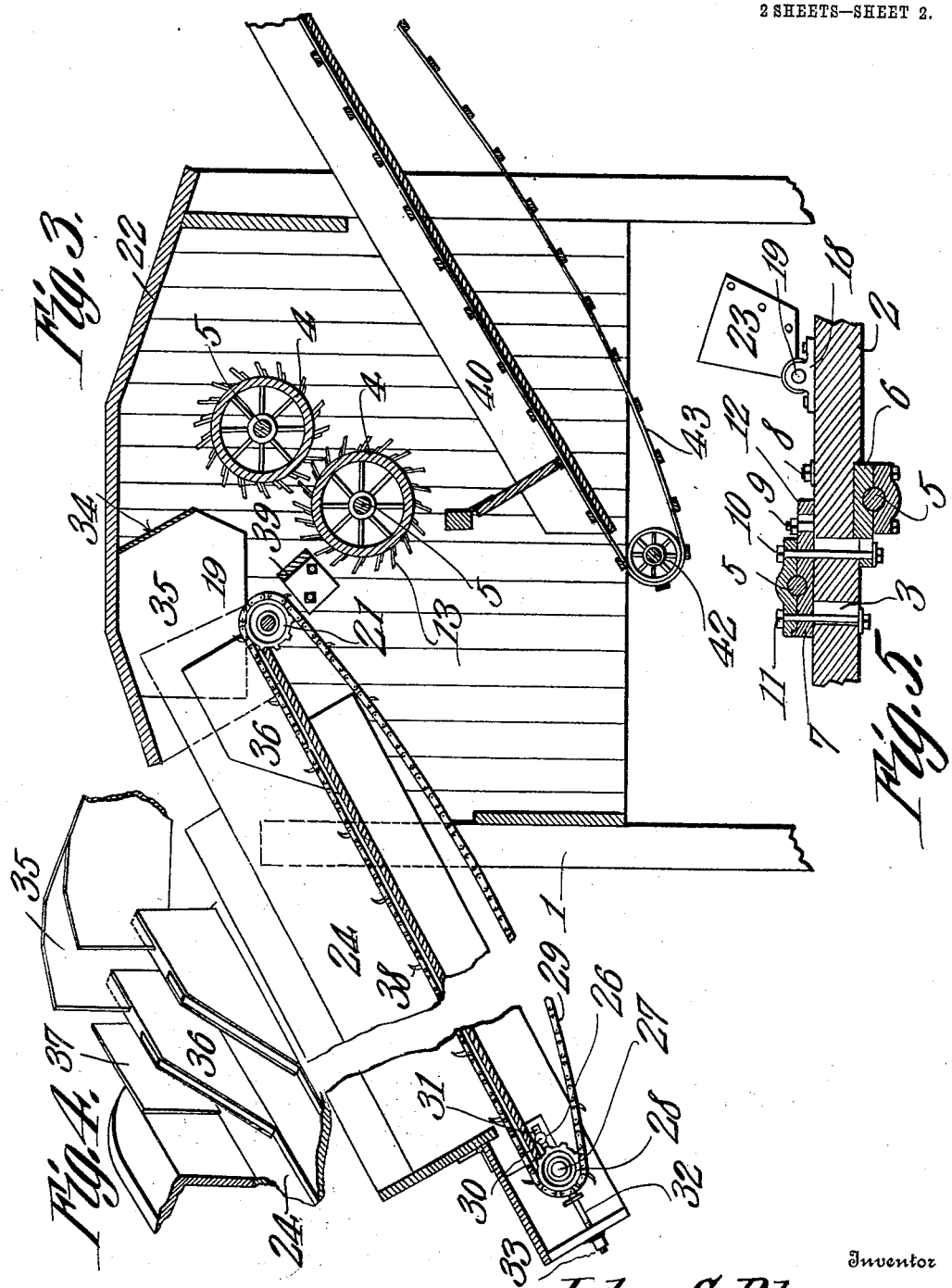

JOHN S. BLOOM, OF INDEPENDENCE, IOWA.

CORN CUTTER AND CRUSHER.

No. 930,137.          Specification of Letters Patent.          Patented Aug. 3, 1909.

Application filed July 22, 1908. Serial No. 444,806.

*To all whom it may concern:*

Be it known that I, JOHN S. BLOOM, a citizen of the United States, residing at Independence, in the county of Buchanan and State of Iowa, have invented a new and useful Corn Cutter and Crusher, of which the following is a specification.

This invention has relation to corn cutters and crushers, and it consists in the novel construction and arrangement of its parts, as hereinafter shown and described.

The present invention is an improvement upon the corn cutter and crusher for which Letters Patent of the United States No. 733,454, were granted to me upon July 14th, 1903.

The object of the present invention is to provide a machine as indicated in which structure is employed, by means of which ear corn may be regularly fed to the cutting and crushing rolls and cylinders. As the improvements in the present invention reside primarily in the specific structure and arrangement of the various parts, the advantages gained by such structure and arrangement will become apparent in view of the subjoined detailed description.

In the accompanying drawings:—Figure 1 is a side elevation of the cutter and crusher. Fig. 2 is a top plan view of a portion of the same with parts broken away. Fig. 3 is a longitudinal sectional view of the same. Fig. 4 is a detailed perspective view of parts of the cutter and crusher. Fig. 5 is a detail sectional view of a portion of one of the side bars used in the frame of the cutter and crusher.

The frame 1, may be of any suitable construction and is here shown as provided on opposite sides with a pair of bars 2. The said bars are provided with vertical longitudinal slots 3, of suitable length near the central portions of the said bars. The cutting and crushing cylinders or rolls 4, have their shafts 5, journaled, respectively in the bearings 6 and 7. The bearings 6 are secured upon the under sides of the bars 2, by the bolts 8 and 9, which pass transversely through the end portions of the said bearings and through the said bars 2, and hold the said bearings in fixed positions upon the said bars. The bolts 10 and 11 pass transversely through the end portions of the bearings 7, and also through the slots 3, provided in the bars 2, and thus means is provided for adjusting the bearings 7 longitudinally along the said bars 2. The bolt 9 passes through the slotted lugs 12, provided upon the bearings 7, and the bolt 10 passes through a similar lug, provided upon the bearings 6. It will be understood that prior to adjusting the bearings 7, the nut of the bolts 9, 10 and 11, must be loosened and that the same must be re-tightened after said bearings have been adjusted.

The blades 13, are mounted upon the rolls 4, and the blades upon one roll intermesh with the blades upon the other roll, in the manner as shown in Fig. 3 of the drawings. The shafts 5, of the cutting and crushing rolls are provided at one end portion with the inter-meshing gear-wheel 14, and the shaft of the relatively fixed, non-adjustable roll is further provided with a sprocket-wheel 15, and with a power pulley 16. It will be understood that the rolls rotate in reverse directions and that the same serve to cut and crush ear-corn which is fed thereto and which passes between them.

A fly-wheel 17, is mounted upon the same shaft as the power-pulley 16, but at the opposite side of the frame 1. The bearings 18, are mounted upon the upper side of the bars 2, and the shaft 19, is journaled for rotation in the said bearings 18. The sprocket-wheel 20, is mounted upon one end portion of the shaft 19, and the smaller sprocket-wheels 21, are mounted upon intermediate portions of the said shaft 19, and are located between the sides of the frame 1. The hood 22, is superposed upon the frame 1, and is located between the sides of the same. The said hood is open at its opposite ends, as shown. The plates 23, are pivotally mounted upon the end portions of the shaft 19, and lie between the bearings 18, and the sides of the hood 22. One end of the trough 24 is attached to the free end portions of the plates 23, and the said trough 24 is adapted to swing in a vertical arc.

The longitudinally extensible members 25, are secured at their upper ends to the outer end portion of the trough 24, and at their lower ends to the lower portion of the frame 1. As indicated, the said members 25, may be extended or contracted, whereby the outer end portion of the said trough 24 may be raised or lowered as desired. The adjustable bearings 26 are slidably mounted in the outer end portion of the trough 24, and the shaft 27, is journaled for rotation in the said bearings 26. The sprocket-wheels 28 are mounted upon intermediate portion of the said shaft 27, and the sprocket-chains 29 pass around the sprocket-wheels 21 and 28, and have their upper runs located above the bottom of the trough 24, and their lower runs below the said bottom. The bolts 30, are attached to the bearings 26, and pass transversely through the elongated slots 31, provided in the sides of the trough 24. The inner ends of the traction bolt 32, are connected with the bearings 26, and the outer ends of the said bolt 32 pass through the ends of the trough 24, and are provided with the nuts 33, which bear against the ends of the said trough. Thus it is obvious that by tightening the nuts 33 upon the bolt 32, that the bearings 26 may be shifted longitudinally along the trough 24, and thus the chains 29 may be loosened or tightened as desired.

The cross-plate 34, is located in the upper portion of the hood 22 at a point between the shaft 19 and the adjustable shaft 5. The parallel plates 35, are connected at their rear ends with the cross-plates 34, and at their upper edges with the top of the hood 22. The inner portion of the trough 24 is provided with the partitions 36, the inner ends of which are slotted and are adapted to receive the outer ends of the parallel plates 35. The inner sides of the trough 24 are also provided with the plates 37, which are adapted to overlap the inner sides of the hood 22. The plates 37 slidably engage the sides of the said hood 22, while the parallel plates 35 slidably engage the slots provided at the end portions of the partitions 36. The chains 29 pass between the partitions 36, and are provided with the spurs 38. The inclined plate 39 is attached at its ends to the sides of the frame 1, and is located below the shaft 19, and is disposed toward the cutting and crushing rolls and is adapted to direct material from the chains which pass through the said trough to the said roll. The trough 40 is connected with that end of the frame 1 opposite to the end to which the trough 24 is attached, and is provided at its upper end portion with a roller 41. The shaft 42 is journaled for rotation in the lower portion of the frame 1, and the endless conveyer 43 passes around the roller 41, and the shaft 42. The sprocket-wheel 44 is mounted upon the end portion of the shaft 42, and the sprocket-chain 45, passes around the sprocket-wheels 44, 20 and 15. Thus movement is transmitted from the shaft carrying the fly-wheel 17, to the conveyer 43, in the delivery trough, and the sprocket chains 29, in the feed trough.

From the above description, it is obvious that ear corn may be indiscriminately shoveled into the feed-trough 24, and that the said ears will be picked up by the lugs or spurs 38, carried by the sprocket-chain 29, and that the ears will be conveyed end first through the spaces between the partitions 36, and that the ears will be delivered to the cutting or crushing rolls end first. The ears that are thus delivered to the said rolls will be cut and crushed into desirable stock-feed, and by adjusting the bearings 7, the said feed may be rendered comparatively coarse or fine, as desired, as one of the rolls will be moved with relation to the other roll.

Having described my invention, what I claim as new, and desire to secure by Letters Patent, is:—

1. A cutter and crusher comprising a frame, rolls journaled for rotation in the frame, a shaft journaled for rotation in the frame, plates pivotally mounted upon the shaft and lying against the sides of the frame, a feed-trough attached to the said plates, endless conveyer belts mounted for movement in the said trough transversely with relation to the rolls, partitions located upon the bottom of the feed-trough, said conveyer belts passing through the spaces between said partitions, said partitions being slotted at the ends, parallel plates fixed with relation to the frame of the machine and projecting at their end portions into the slots in said partitions.

2. A cutter and crusher comprising a frame having side bars, bearings located against the under sides of the side bars, bearings located on the upper sides of the side bars, the upper and lower bearings having slotted lugs, the end portions of the upper bearings having the slotted lugs overlapping the end portions of the lower bearings having the slotted lugs, bolts passing through the lower bearings and the side bars, one bolt of each of the lower bearings passing through the slot of the lug of the overlapping bearing, bolts passing through the upper bearings, said side bars having elongated slots which receive the intermediate portions of the last said bolts, one bolt of each of the upper bearings passing through the slot of the lug of the underlying bearings, rolls journaled in the bearings, and a feed-trough attached to the frame and disposed toward the rolls.

In testimony that I claim the foregoing as my own, I have hereto affixed my signature in the presence of two witnesses.

JOHN S. BLOOM.

Witnesses:
R. B. BAINES,
W. G. STEVENSON.